US006997593B2

(12) United States Patent
Yeo et al.

(10) Patent No.: US 6,997,593 B2
(45) Date of Patent: Feb. 14, 2006

(54) NOVELTY CANDY ASSEMBLY WITH MELODIC AND/OR ILLUMINATION FUNCTIONS

(75) Inventors: Tze Phem Ricky Yeo, Singapore (SG); Kwee Seng David Yeo, Singapore (SG)

(73) Assignee: 1st Choice Product Pte Ltd., (SG)

( * ) Notice: Subject to any disclaimer, the term of this patent is extended or adjusted under 35 U.S.C. 154(b) by 108 days.

(21) Appl. No.: 10/714,327

(22) Filed: Nov. 14, 2003

(65) Prior Publication Data

US 2005/0117328 A1    Jun. 2, 2005

(51) Int. Cl.
*F21W 121/00* (2006.01)

(52) U.S. Cl. ............... 362/565; 362/806; 446/227; 426/104

(58) Field of Classification Search ............... 362/101, 362/166, 565, 577, 86, 96, 109, 186, 208, 362/253, 800, 802, 806, 808; 446/219, 227, 446/242; 426/104, 132
See application file for complete search history.

(56) References Cited

U.S. PATENT DOCUMENTS

| | | | | |
|---|---|---|---|---|
| 4,914,748 A | * | 4/1990 | Schlotter et al. ............. 362/109 |
| 5,471,373 A | * | 11/1995 | Coleman et al. ............. 362/109 |
| 5,733,033 A | * | 3/1998 | Coleman et al. ............. 362/109 |
| 5,785,406 A | * | 7/1998 | Lee ............................... 362/96 |
| 6,024,624 A | * | 2/2000 | Lee ............................... 446/81 |
| 6,043,732 A | * | 3/2000 | Shulman ...................... 340/328 |
| 6,062,936 A | * | 5/2000 | Rudell et al. ................. 446/71 |
| 6,135,606 A | * | 10/2000 | Fernandez et al. .......... 362/109 |
| 6,383,536 B1 | * | 5/2002 | Palmer et al. ............... 426/104 |
| 6,619,816 B1 | * | 9/2003 | Johnson ....................... 362/253 |
| 6,659,619 B1 | * | 12/2003 | Gordon ....................... 362/109 |
| 6,811,279 B1 | * | 11/2004 | Coleman et al. ............. 362/101 |
| 6,884,447 B1 | * | 4/2005 | Baker .......................... 426/104 |

* cited by examiner

*Primary Examiner*—Renee Luebke
*Assistant Examiner*—Khanh H. Le
(74) *Attorney, Agent, or Firm*—Greenberg Traurig, LLP

(57) ABSTRACT

There is provided a novelty candy assembly including a body, an illumination module attached to the body, a cover for the illumination module, the cover having at least an outer layer of candy, at least one activation conduit extending through the cover and being operatively connected to an activation switch within the body, at least one speaker within the body, and at least one memory chip within the body. The activation switch is activated when the candy is at least in part consumed, the activation switch being part of a circuit including the illumination module, the memory chip, and the speaker. Pre-recorded audio in the memory chip is reproduced by the at least one speaker and illumination is produced by the illumination module when the activation switch is activated.

13 Claims, 3 Drawing Sheets

NOVELTY CANDY ASSEMBLY WITH MELODIC AND/OR ILLUMINATION FUNCTIONS

FIELD OF THE INVENTION

This invention relates to a novelty candy assembly packaged with confectionery such as, for example, one or more of: hard candy, soft candy, chocolates, and jelly. The use of the candy assembly with its melodic and/or illumination functions is particularly, though not exclusively relevant for celebrating special occasions such as, for example, birthdays, anniversaries, engagements, festivals, retirements and so forth.

BACKGROUND

Candy is often consumed at most celebrations. The variety of candy that is commercially available is large. Candy can be found in a multitude of shapes, colors, flavors, sizes and textures.

In modern commerce where sales of any product may depend on reputation and marketing rather than the product per se, packaging of a product may impact on the sustainability of the product. Packaging should not be overlooked even for basic items like confectionery. Similarly, for candy, a range of packaging can be used to entice consumers. Considerable interest towards a particular candy may be generated by designing candy or packaging with eye-catching designs and colours.

SUMMARY OF INVENTION

There is provided a novelty candy assembly. Preferably, it comprises a body, an illumination module attached to the body, a cover for the illumination module, the cover having at least an outer layer of candy, at least one activation conduit extending through the cover and being operatively connected to an activation switch within the body, at least one speaker within the body, and at least one memory chip within the body. It is advantageous that the at least one memory chip controls the functions of the candy assembly. The body and illumination module may be water-proof. Preferably, the body has at least one printed circuit board. A non-edible cover may also be used in place of the candy cover subsequent to the consumption of the candy.

Preferably, the activation switch is activated when the candy is at least in part consumed, the activation switch being part of a circuit comprising the illumination module, the memory chip and the speaker, and wherein pre-recorded audio in the memory chip is reproduced by the at least one speaker and illumination is produced by the illumination module when the activation switch is activated. The activation conduit may be a channel, and the activation switch may be a vacuum switch. The activation conduit may also be at least one micro-wire. Advantageously, at least one activation conduit extends from the edge of the cover and is directly linked to the activation switch. Preferably, components in the vacuum switch are either made from or coated with material of low coefficient of friction. It is preferable that the circuit includes a main switch.

It is preferable that the body may be in a shape selected from the following: cylindrical, polygonal and spherical. The illuminated module may contain at least one LED. The candy assembly may preferably be powered by a portable power source selected from the group consisting of at least one: batteries and solar cells.

DESCRIPTION OF DRAWINGS

In order that the invention may be better understood and readily put into practical effect, there shall now be described by way of non-limitative example only preferred embodiments of the present invention, the description being in reference to the accompanying illustrative drawings in which.

DESCRIPTION OF PREFERRED EMBODIMENTS

Figure 1:
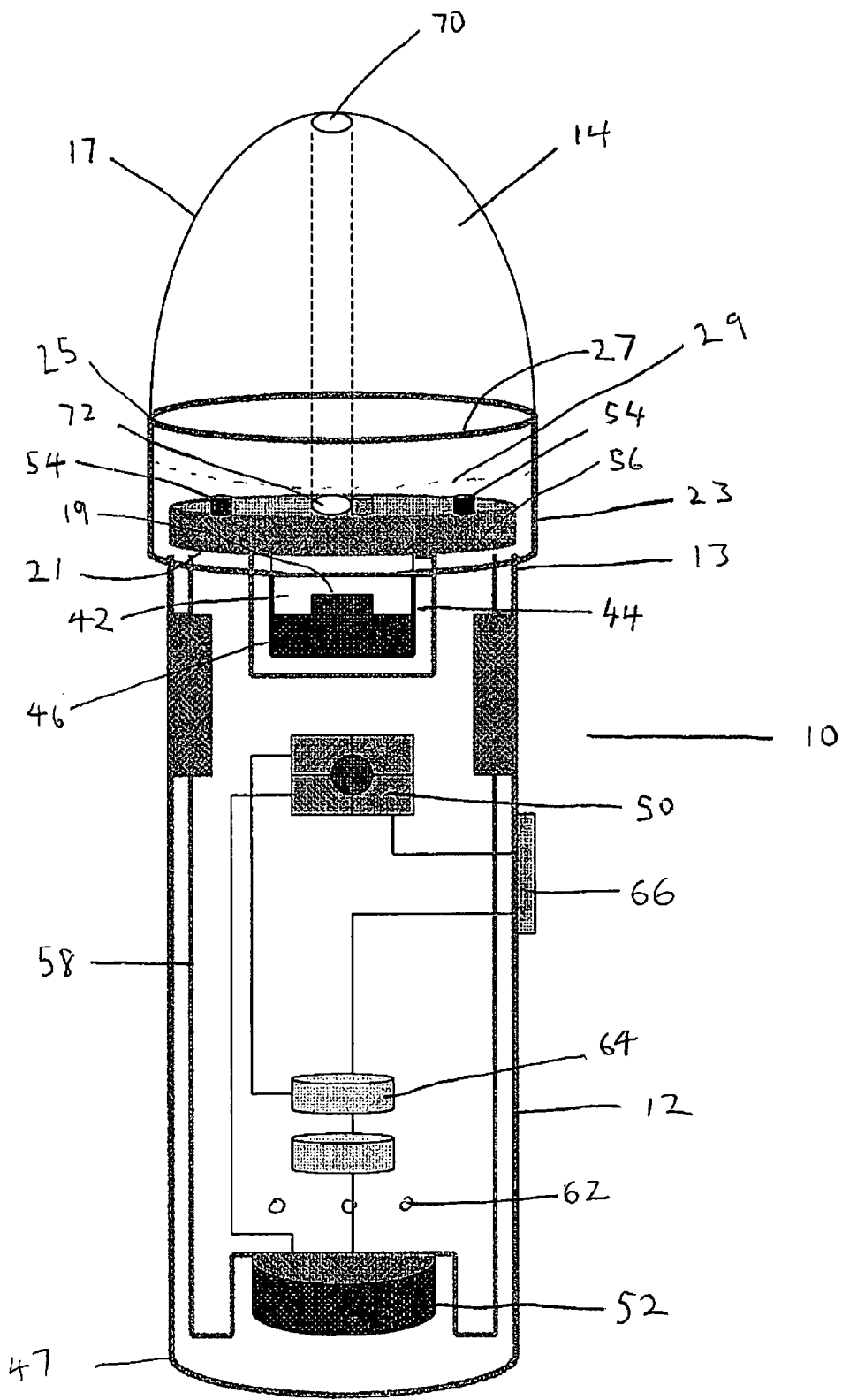
FIG. 1 is a perspective view of parts of the candy assembly with portions of the assembly being broken away to show internal construction.

Referring to FIG. 1, there is provided a novelty candy assembly 10 with melodic and/or illumination functions. The candy assembly 10 comprises a body 12 having an illumination module 23 at a first end 13 of the body 12. A cover 14 at the first end 13 may be formed into different shapes such as, for example, hemispheres, pyramids, cuboids, humanoids or any preferred design to cover and contain the illumination module 23. The cover 14 may be formed from confectionery, such as, for example, hard candy, soft candy, chocolate, and gelatin. The cover 14 may be edible or non-edible. If a cover 14 is non-edible, it may also serve as a decorative ornament. The non-edible cover 14 may also be formed into shapes such as, for example, hemispheres, pyramids, cuboids, humanoids or any preferred design. The edible cover 14 may be external of and enclose a non-edible cover. In this way, the non-edible cover is exposed when the edible cover 14 is consumed. The cover 14 may be opaque, transparent or transluscent.

The cover 14 may have at least one channel 70 running through from an outer edge 17 of the cover 14 through the core 72 of the cover 14 and through illumination module 23. The channel 70 is preferably hollow, and may be co-axial with cover 14 and body 12. There is a vacuum chamber 42 positioned at a first end 13 of the body 12 beneath and behind the illumination module 23. The core 72 of the cover 14 may be directly linked to the vacuum chamber 42 through the illumination module 23.

Figure 3:
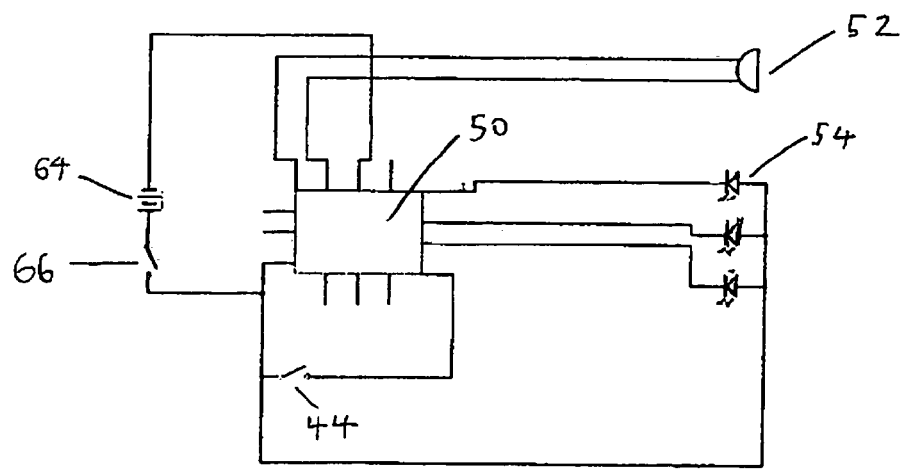
FIG. 3 is a diagram of the circuitry employed in the candy assembly.

An electrical circuit 51 shown in FIG. 3 may be closed when a vacuum pressure switch 44 in the chamber 42 is activated. Relatively moveable parts in the vacuum pressure switch 44 may be made from or coated with a low friction material such as, for example, nylon, ABS, PVC or Teflon. The vacuum pressure switch 44 comprises the vacuum chamber 42 and a piston 46.

Figure 2:
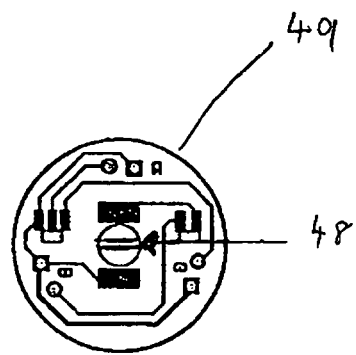
FIG. 2 shows the electrical contact plate positioned on a first end on the internal surface of the body of the candy assembly.

FIG. 2 shows the electrical contact plate 49 positioned on a first end 19 on a piston 46 in the chamber 42. When a consumer sucks on the cover 14, suction is generated through the channel 70. This causes a vacuum pressure differential to be created in the chamber 42. The vacuum pressure differential causes the piston 46 in the chamber 42 to move upward such that at least two metal strips 48 on the electrical contact plate 49 make contact with contact points (not shown) on the internal surface on the first end 13 of the body 12. In this mode, the vacuum pressure switch 44 is activated.

When the vacuum pressure switch 44 is activated, the circuit 51 in FIG. 3 is closed and a voltage is triggered to an I/C memory chip 50. The chip 50 then applies a digital audio signal to an amplifier incorporated in the chip 50. The amplifier is subsequently energized, the digital audio signal amplified, converted to analog, and a miniature speaker 52 is activated to reproduce a pre-programmed melody from the audio signal. The pre-programmed melody may be in different genres of music, such as, for example, Christmas carols, children's songs, pop tunes, classical tunes and so forth. The pre-programmed melody may even be in the form of a vocal rendition, or a spoken message.

Besides the activation of the pre-programmed melody, at least one LED 54 on the illumination module 23 may also be activated when the circuit 51 in FIG. 3 is closed. The LED 54 may be programmed in the I/C memory chip 50 to:

flash in synchronisation with the pre-programmed melody;

flash randomly; or remain illuminated.

When the cover 14 is not made from an opaque material, illumination from LED 54, whether flashing or not, may be seen through cover 14 to create an eye-catching appearance, thus enhancing its appeal. The LED 54 may be of any suitable colour including white and/or blue and/or green and/or red. A plurality of LEDs of the same or different colours may be used.

The body 12 may be made from any suitable material such as, for example, plastic, aluminum, stainless steel, and so forth. The body 12 may be shaped into any form and be of any suitable size. Preferably, it is of a size and shape that fits within the palm of a hand, with the embodiment as described being cylindrical in shape. The shape may also be spherical or polygonal. The body 12 has an open top at the first end 13. A lower end 21 of the illumination module 23 is securely fixed onto the first end 13 of the body 12. The body 12 may also have shapes or designs embossed on them for enhanced aesthetic appeal.

The illumination module 23 also has an open top at a top end 25. There is a recess 27 on the illumination module 23 to allow for the secure placement therein of a lower edge 29 of the cover 14.

An electronic circuit board 58 is contained within the body 12. The illumination module 23 also has an electronic circuit board 56 incorporated in it. The board 56 controls the at least one LED 54 in the illumination module 23. Each LED 54 and the board 56 may be sealed in a water-tight manner to allow for the illumination module 23 to be cleaned subsequent to the consumption of the edible cover 14. Both circuit boards are connected electrically to the vacuum switch 44.

The miniature speaker 52 may be electronically actuated. The speaker 52 may be located internally at a second end 47 of the body 12. The second end 47 of the body 12 may be enlarged to accommodate the speaker 52 and to provide a broad base to ensure better stability when the candy assembly 10 is positioned in an upright position. Hence, the candy assembly 10 may also be used as an ornamental display piece subsequent to the consumption of the edible cover 14. Holes 62 may be formed in the body 12 to allow for the transmission of sound waves from the speaker 52 to the surroundings. However, when holes 62 are present, the candy assembly 10 would no longer be water-proof.

The circuit 51 shown in FIG. 3 may be powered by a power source 64. The power source 64 should be portable and may be either batteries or at least one solar cell. The power source may be changeable through a cover (not shown). The cover may be water-tight. The power source 64 may have a resistor connected across the memory chip 50 to ensure that the chip 50 does not overheat. The resistor is placed in series with the vacuum pressure switch 44. A main switch 66 may be used to control the flow of current in the electrical circuit 51. The main switch 66 may be a slide switch, a knob switch or a hand pressure sensitive switch.

A timer may be included on the circuit board 58 so that upon activation of the illumination module 23 and/or speaker 52, they will operate for a pre-determined period after the suction in channel 70 ceases. The pre-determined period may be the duration of the pre-recorded melody played by speaker 52. It may also be preset to a shorter time period.

Figure 4:
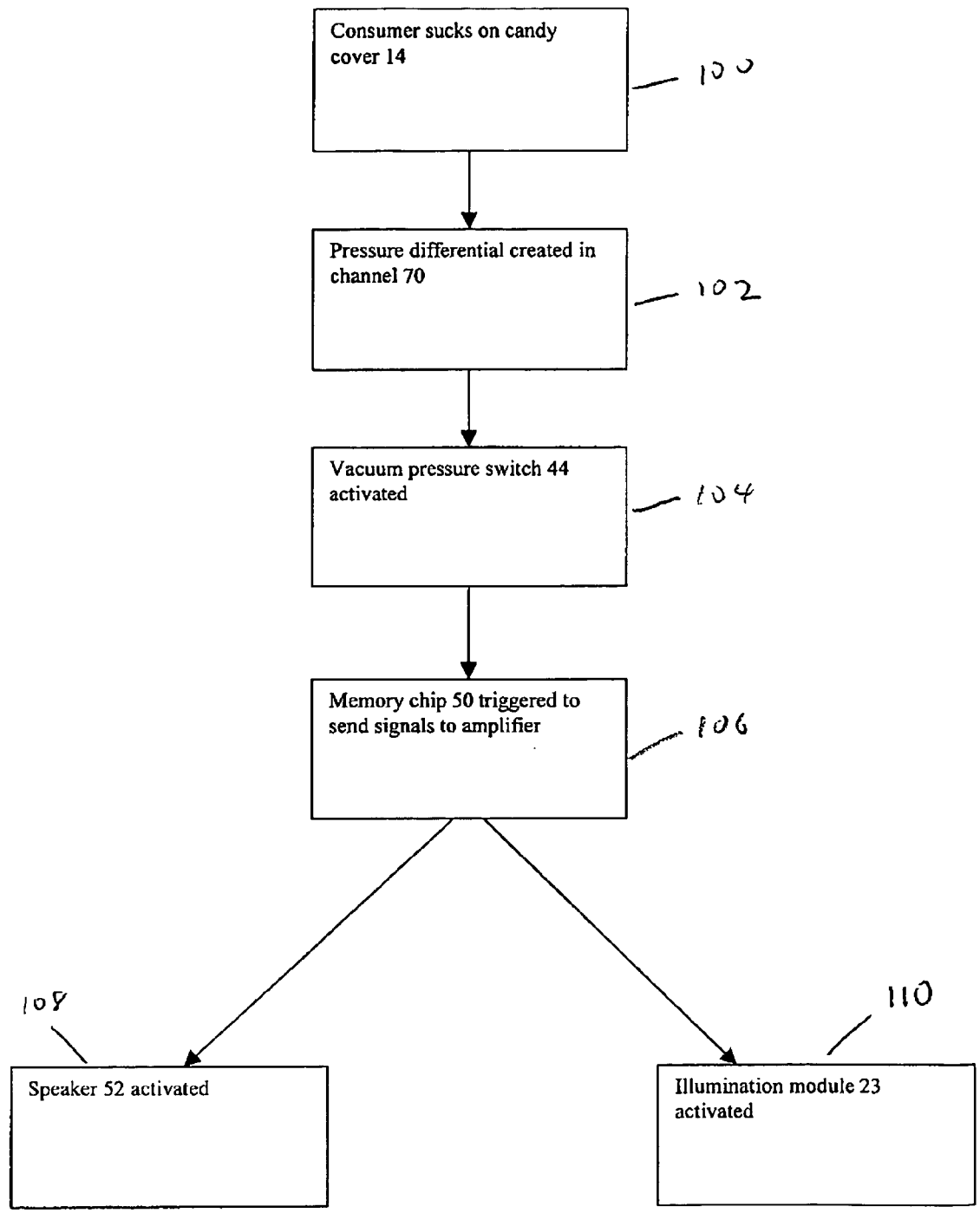
FIG. 4 a flow chart showing the preferred embodiment of the present invention.

Referring to FIG. 4, a consumer sucks 100 on the candy cover 14. This activates 104 the vacuum pressure switch 44 because of the pressure differential 102 in channel 70. This closes circuit 51. A voltage triggers the memory chip 50 to send the digital audio signals to the amplifier 106 and digital-analog converter and thus to the speaker 52. The LED 54 on the illumination module 23 is illuminated. The speaker 52 reproduces musical tones, a melody, a song, spoken message or other sounds. The cover 14 is consumable and dissolves while being sucked. When the consumer stops sucking the cover 14, the vacuum pressure switch 44 is de-activated. This cuts off the voltage supply to the circuit 51 and the sounds emitted by the speaker 52 ceases after a pre-determined period. The LED 54 on the illumination module 23 also ceases to be illuminated after a pre-determined period.

In another embodiment of the present invention that is only applicable when the cover 14 is manufactured from either soft or hard candy, instead of a vacuum pressure switch 44 employed in the body 12, a micro-wire is positioned within in the soft candy in the cover 14. When a consumer eats the candy, the heat from the consumer would cause the wire to expand radially, thus increasing the cross-sectional area of the wire and hence reducing its resistance and allowing more current to flow in circuit 51. Consequently, illumination and sound from the candy assembly 10 are also provided. The micro-wire may be made from metals with the characteristics of high expansivity, high conductivity, low toxicity, and resistance to oxidation. Stainless steel would have these characteristics.

In yet another embodiment of the present invention, instead of a vacuum pressure switch 44 employed in the body 12, two micro-wire leads are positioned in the cover 14. When a consumer contacts the cover 14, the inert potential in the consumer would close the circuit 51. Consequently, illumination and sound from the candy assembly 10 are also provided. The micro-wire may be made from metals with the characteristics of high expansivity, high conductivity, low toxicity, and resistance to oxidation. Stainless steel would have these characteristics.

The candy assembly 10 may be readily manufactured by mass production machinery at low cost. The candy assembly 10 requires little skill and instruction to operate. The cover 14 may be manufactured with FDA approved food grade colorings and conforms to hygienic and accredited candy manufacturing processes.

The cover 14 may be wholly consumed or it may be discarded semi-eaten. Ornamental covers may be provided at the point of sale to be used to replace the consumed cover 14. The candy assembly 10 may contain different prerecorded songs or melodies suitable for different occasions such as, for example, birthdays, wedding anniversaries, Christmas parties, engagements, children's parties and the like all year round. The festive mood of an occasion may be enhanced by the purchase of such candy assemblies 10.

Whilst there has been described in the foregoing description preferred embodiments of the present invention, it will be understood by those skilled in the technology concerned that many variations or modifications may be made to details of design or construction without departing from the present invention.

The present invention extends to all features disclosed either individually, or in all possible permutations and combinations.

The invention claimed is:

1. A novelty candy assembly, comprising:
 a body;
 an illumination module attached to the body;
 a cover for the illumination module, the cover having at least an outer layer of candy;
 at least one activation conduit extending through the cover for creating a vacuum pressure differential in the body and being operatively connected to an activation switch within the body;
 at least one speaker within the body; and
 at least one memory chip within the body;
 wherein the activation switch is activated by the vacuum pressure differential when the candy is at least in part consumed, the activation switch being part of a circuit comprising the illumination module, the memory chip and the speaker, and wherein pre-recorded audio in the memory chip is reproduced by the at least one speaker and illumination is produced by the illumination module when the activation switch is activated.

2. A novelty candy assembly as claimed in claim 1, wherein the activation conduit is a channel, and the activation switch is a vacuum switch.

3. A novelty candy assembly as claimed in claim 2, wherein components in the vacuum switch are made from material of low coefficient of friction.

4. A novelty candy assembly as claimed in claim 2, wherein components in the vacuum switch are coated with material of low coefficient of friction.

5. A novelty candy assembly as claimed in claim 1, wherein the body may be in a shape selected from the following: cylindrical, polygonal and spherical.

6. A novelty candy assembly as claimed in claim 5, wherein the illuminated module contains at least one LED.

7. A novelty candy assembly as claimed in claim 6, wherein the at least one activation conduit extends from the edge of the cover and is directly linked to the activation switch.

8. A novelty candy assembly as claimed in claim 7, further including a portable power source comprising batteries.

9. A novelty candy assembly as claimed in claim 8, wherein the at least one memory chip controls functions of the candy assembly.

10. A novelty candy assembly as claimed in claim 1, wherein the body and illumination module are water-proof.

11. A novelty candy assembly as claimed in claim 1, wherein a non-edible cover added subsequent to the consumption of the candy.

12. A novelty candy assembly as claimed in claim 1, wherein the body has at least one printed circuit board.

13. A novelty candy assembly as claimed in claim 1, wherein the circuit includes a main switch.

* * * * *